(No Model.)
F. W. CARPENTER.
TOY HORSE AND CART.
No. 287,095. Patented Oct. 23, 1883.
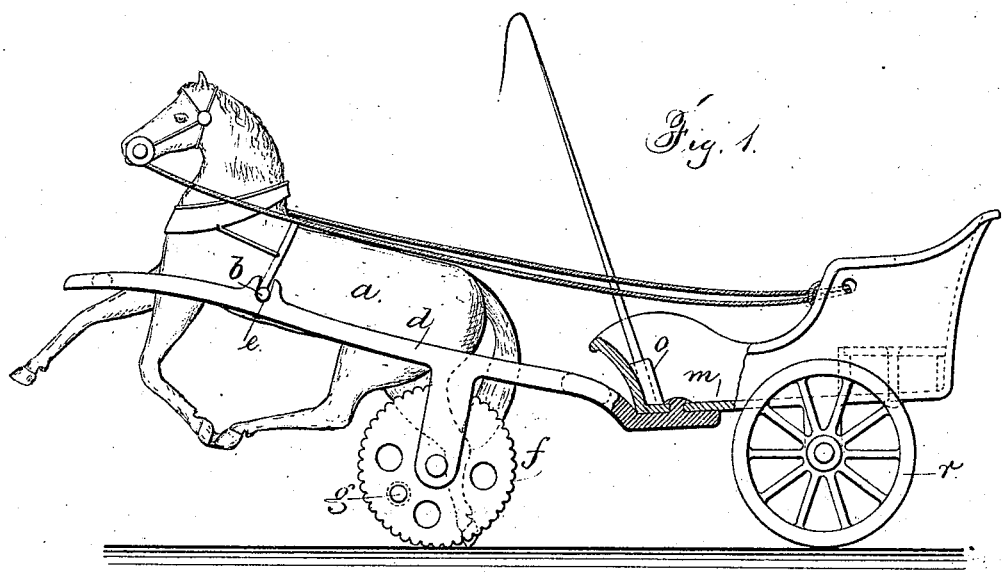
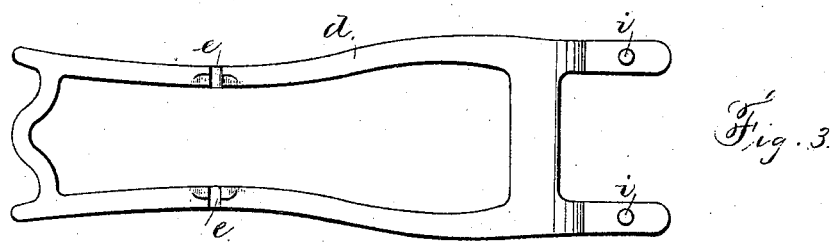
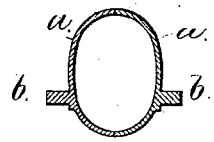
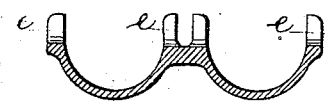
Witnesses
Harold Serrell
J. Staub
Inventor
Francis W. Carpenter
per Lemuel W. Serrell
Atty
N. PETERS, Photo-Lithographer, Washington, D. C.

UNITED STATES PATENT OFFICE.

FRANCIS W. CARPENTER, OF HARRISON, NEW YORK.

TOY HORSE AND CART.

SPECIFICATION forming part of Letters Patent No. 287,095, dated October 23, 1883.

Application filed August 22, 1883. (No model.)

*To all whom it may concern:*

Be it known that I, FRANCIS W. CARPENTER, of Harrison, in the county of Westchester and State of New York, have invented an Improvement in Toy Horses and Carts, of which the following is a specification.

In Letters Patent No. 251,093, heretofore granted to me, a toy horse is shown as made of two parts with a pivot-pin running through the same, and upon which the horse can be swung by the action of a wheel and crank, as in my Patent No. 274,270, or by a wheel and flexible connection from the head to a crank-pin.

My present invention is for avoiding the separate pivot-pin, so as to lessen the expense by rendering it unnecessary to bore any holes in the metal, and at the same time there are no loose pieces that are liable to be lost, and a child can remove the horse or replace the same without risk of injury to the fingers. Besides this, I make the shafts that receive the horse with open bearings for receiving the pivots upon the horse, and with rivets that pass into openings cast in the body of the cart, the shafts being of malleable cast-iron, so as not to be liable to break, and so that the rivets can be spread by hammering to secure the shafts to the cart.

In the drawings, Figure 1 is a side view of the horse and cart, with the cart partially in section. Fig. 2 is a cross-section of the shafts and horse. Fig. 3 is a plan of the shafts separately, and Fig. 4 illustrates the mode of making the support for the pivots of the horse where a pole is used and two horses.

The horse is made of two halves, *a a*, of cast metal. These are secured together in any suitable manner, preferably by projections, as shown in my Patent No. 251,093. The pivots *b b* are cast upon and project from the respective sides of the horse. The shafts *d* are of malleable cast metal, preferably iron, and they are provided with the open pivotal bearings *e*, so that the horse can be lifted out or dropped into such bearings, and when in such bearings the horse can be swung or rocked by the wheels *f* and the intermediate crank, *g*, acting upon one of the legs of the horse as the toy is drawn along, as in my Patent No. 274,270; or the horse may be rocked or swung by a connection to the head, as in my Patent No. 251,093, or in any other suitable manner. The open or notched pivot-bearings *e* will be upon a yoke-piece, as seen in Fig. 4, where two horses are used with an intermediate tongue, such yoke-pieces extending down below the horse's belly and up to the proper level to receive the pivot-pins.

The horses can be easily removed, either from the shafts or from the tongue and yoke, and may be used by the children separately or replaced with facility.

The shafts are adapted to pass at their rear ends beneath the wagon-body *m*, and there are studs *i* cast on the upper parts of such shafts, near the ends, so as to be passed through holes cast in the bottom of the cart, and, being of malleable cast metal, such studs are spread by hammering, and they rivet the shafts to the cart-body. This avoids the necessity of using separate rivets or drilling-holes.

The wagon-body *m* is of suitable shape and mounted on wheels *r*, and there is a lug, *o*, cast in the inner angle of the body at the front right-hand side, and a socket is formed in said lug to receive a toy whip.

This improvement may be applied to other vehicles besides carts—such as toy sleds, &c.

It is preferable to cast the pivot-pin with the body of the horse; but a piece or pieces of wire may be used to form the permanent pivots, such wire being put into the sand and the metal cast around the same, or the wire driven into place through holes provided for it.

I claim as my invention—

1. The cast-metal toy horse having pivot-pins projecting at opposite sides of the horse, one on each of the halves thereof, and adapted to be received into notched or open bearings, substantially as set forth.

2. The shafts for a toy horse and vehicle, formed of malleable cast metal, with projecting studs to be riveted to the body of the vehicle, substantially as set forth.

3. The combination, with the cast-metal toy horse having pivot-pins projecting at opposite sides, of notched or open bearings for the same upon the shafts or tongue, substantially as set forth.

4. The combination, with a cast-metal toy vehicle having holes cast in it, of malleable cast-metal shafts having projecting pins, forming rivets to secure the shafts to the cart, as set forth.

5. A toy vehicle of cast metal, having a lug cast in one corner, in which a socket is formed for the reception of a toy whip, substantially as set forth.

Signed by me this 18th day of August, A. D. 1883.

FRANCIS W. CARPENTER.

Witnesses:
GEO. T. PINCKNEY,
WILLIAM G. MOTT.